Patented Feb. 19, 1946

2,395,281

UNITED STATES PATENT OFFICE 2,395,281

ETHANOLAMINE

Donald John Loder, Wilmington, Del., assignor to E. I. du Pont de Nemours & Company, Wilmington, Del., a corporation of Delaware No Drawing. Application February 14, 1942, Serial No. 430,996

7 Claims. (Cl. 260—584)

This invention relates to a process for the preparation of alkanolamines and more particularly to the preparation of ethanolamine from aminoethyl acetals and their salts.

An object of the present invention is to provide a process for the preparation of ethanolamine from alkyl aminoalkyl acetals (alkoxyalkoxy ethyl amines). Another object is to provide a process for the preparation of ethanolamine from the salts of aminoacetals. Yet another object is to provide a process wherein aminoacetals in the presence of an alcohol and an inorganic acid are converted to an acetal and ethanolamine. Other objects and advantages of the invention will hereinafter appear.

It has been found that if an aminoacetal is reacted with an inorganic acid in the presence of an alcohol there are obtained as a result of the reaction an acetal and the corresponding salt of ethanolamine and from the salt, ethanolamine is liberated by treating the salt with a base. The reaction is generically illustrated by the following equation:

(1) 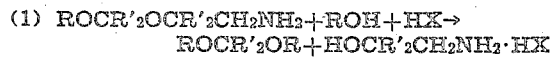

in which R is an alkyl or substituted alkyl group, R' is hydrogen, alkyl or substituted alkyl group, and X is the anion of an inorganic acid.

More specifically the invention may be illustrated by the following equation:

(2) 

In Equation 2 it will be noted that methyl aminoethyl formal in the presence of methanol and hydrogen chloride is converted to ethanol amine hydrogen chloride and methylal is likewise prepared, which being volatile under the conditions of the reaction, distills over. The ethanolamine hydrochloride may be treated with a suitable base whereupon it is converted to ethanolamine.

The reaction is preferably conducted at reflux temperature of the reaction mixture and preferably under such temperature and pressure conditions that the acetal formed as a result of the reaction distills over. For example, if the acetal formed during the reaction is methylal, the temperature of the reaction at atmospheric pressure will be at approximately 42° C.; if ethylal, the reaction temperature at atmospheric pressure will be 76° C. Similarly, with other acetals the reaction temperature is preferably governed by the temperature at which the acetal or its azeotrope with the alcohol will distill over. The reaction may be carried out at subatmospheric, atmospheric, or superatmospheric pressures as described. It is often desirable in order to be sure all of the lower boiling acetal produced has been removed to increase the temperature of distillation somewhat above the boiling point of the azeotrope formed and it has been found that by increasing it to approximately the boiling temperature of the alcohol present satisfies these requirements.

Ethanolamine can be prepared in accord with the invention from alkyl aminoethyl acetals generally and more particularly from the methyl, ethyl n- and isopropyl, n- and isobutyl and higher alkyl, alkyl amine, and more especially ethylamine formals. Aminoacetals and aminoformals can be prepared by a three-step process. The first step involves the reaction of an acetal or formal with a cyanohydrin in the presence of an acid catalyst and at a temperature between room temperature and 300° C. In the second step, the substituted nitrile produced in accord with the first step is hydrogenated preferably in the liquid phase, using a suitable hydrogenation catalyst at a temperature between 25° and 200° C. and under a pressure between 200 and 700 atmospheres. In the third step, the substituted amine of the second step is converted to a salt by the addition of organic or an inorganic acid at a temperature between 0 and 100° C. and said salt, neutralized with a suitable base, such as alkali metal hydroxide, the aminoacetal being recovered from the neutralized product by distillation. The reaction likewise can be carried out with higher acetals of the same type such, for example, as methyl ethylamine acetal, methyl ethylamine propionaldehyde acetal, and so forth. The reaction is conducted, as has been stated, in the presence of an alcohol, preferably present in molar excess, say 1 to 4 moles thereof per mole of the acetal, and preferably an alcohol is employed such that as a result of the reaction a symmetrical, low boiling acetal will be produced which can be readily removed from the reaction by distillation. Thus, when carrying out the reaction with methyl ethyl n- and isopropyl, n- and isobutyl ethyl amine formals, the alcohols used are preferably methyl, ethyl, n- and isopropyl, n- and isobutyl alcohols respectively. The reaction may likewise be conducted in the presence of an excess of methanol when alkyl aminoethyl acetals are used in which the alkyl group is higher than methyl. In accord with this feature of the invention the unsymmetrical acetal formed during the reaction will react with the excess methanol to give methylal which, being a low boiler, is readily removed during the reaction.

The reaction is carried out in the presence of an inorganic acid such, for example, as hydrochloric, sulfuric, phosphoric or other suitable inorganic acid and the product of the reaction in the presence of such acids will, as has been indicated, be an ethanol amine salt of the inorganic acid. In order to convert this salt to ethanolamine, it is neutralized with an organic or inorganic base such, for example, as sodium hydroxide, potassium hydroxide, sodium methoxide, ammonia, pyridine, or the like.

The more detailed practice of the invention is illustrated by the following examples in which parts are by weight unless otherwise indicated.

*Example 1.*—A mixture consisting of 68.3 parts of isobutyl aminoethyl formal, 51 parts of sulfuric acid and 216 parts of methanol was distilled through an efficient fractionating column until all the methylal formed was removed as its methanol azeotrope, the distillation being effected at a temperature of approximately 41.8° C. The product was cooled, saturated with ammonia, and the ammonium sulfate which precipitated was filtered off. The ammonia treatment was repeated three times and the product distilled, whereupon ethanolamine was obtained in a yield of 67%.

*Example 2.*—Dried hydrogen chloride, 16.4 parts, was added slowly with cooling to a mixture consisting of 59 parts of isobutyl aminoethyl formal and 200 parts of methanol. The resulting reaction mixture was carefully distilled through an efficient fractionating column until methylal was completely removed as its methanol azeotrope (B. P. 41.8° C.). The cooled product was saturated with ammonia whereupon ammonium chloride precipitated. After removing the salt, this operation was repeated four times. Practically all of the hydrogen chloride originally present as the ethanolamine salt was precipitated as ammonium chloride. Distillation gave ethanolamine in 78.5% conversion.

Alkanolamines prepared in accord with this invention are used as intermediates in the preparation of Cellophane softening agents and in polymeric resinous materials generally.

I claim:

1. A process for the preparation of ethanolamine which comprises reacting an alkyl aminoethyl formal, in which the alkyl group contains from 1 to 4 carbon atoms inclusive, with an inorganic acid and a stoichiometrical excess of methanol at approximately 41.8 to 64° C., removing the methylal as formed by distillation, when substantially all of the methylal has been removed treating the product with a base and recovering ethanolamine therefrom.

2. A process for the preparation of ethanolamine which comprises reacting an alkyl aminoethyl formal, in which the alkyl group contains from 1 to 4 carbon atoms inclusive, with hydrogen chloride and a stoichiometrical excess of methanol at approximately 41.8 to 64° C., removing the methylal as formed by distillation, when substantially all of the methylal has been removed treating the product with a base and recovering ethanolamine therefrom.

3. A process for the preparation of ethanolamine which comprises reacting methyl aminoethyl formal with a stoichiometrical excess of methanol and an inorganic acid at a temperature of approximately the boiling point of methylal, removing the methylal formed as a result of the reaction as formed by distillation and subsequently cooling the reaction product and recovering the ethanolamine therefrom by neutralization.

4. A process for the preparation of ethanolamine which comprises adding slowly with cooling 16.4 parts of dried hydrogen chloride to a mixture of 59 parts of isobutyl aminoethyl formal and 200 parts of methanol, distilling off the methylal as its methanol azeotrope at approximately 41.8° C., cooling the product, saturating it with ammonia to precipitate ammonium chloride, removing the ammonium chloride and finally, by distillation, recovering the ethanolamine.

5. A process for the preparation of ethanolamine which comprises reacting isobutyl amino ethyl formal with a stoichiometrical excess of methanol and sulfuric acid at approximately 41.8 to 64° C., distilling over the methylal as formed and when substantially all of the methylal has been withdrawn from the reaction, cooling the reaction mixture and neutralizing it with ammonia for the recovery of ethanolamine.

6. A process for the preparation of ethanolamine which comprises preparing a mixture containing the following approximate composition: 68.3 parts of isobutyl aminoethyl formal, 51 parts of sulfuric acid, and 216 parts of methanol, effecting the reaction at approximately 41.8 to 64° C., removing the methylal as formed by distillation and continuing the reaction until all of the methylal formed is removed and after cooling the reaction product saturating it with ammonia, filtering off the ammonium sulfate formed, and recovering therefrom the ethanolamine.

7. A process for the preparation of ethanolamine which comprises heating a mixture of an alkyl aminoethyl formal in which the alkyl group contains from 1 to 4 carbon atoms inclusive with an inorganic acid and a stoichiometrical excess of methanol at substantially the reflux temperature of the mixture, removing the methylal as formed by distillation and when substantially all of the methylal has been removed, treating the resulting reaction mixture with a base and recovering therefrom the ethanolamine.

DONALD JOHN LODER.